United States Patent
Lin et al.

(10) Patent No.: US 8,341,656 B2
(45) Date of Patent: Dec. 25, 2012

(54) SLIM OPTICAL DISC DRIVE WITH FLEXIBLE FLAT CABLE ASSEMBLY

(75) Inventors: Chia-Yuan Lin, Hsinchu (TW);
Jung-Fu Chen, Hsinchu (TW);
In-Shuen Lee, Hsinchu (TW);
Chih-Ming Yang, Hsinchu (TW)

(73) Assignee: Philips & Lite-On Digital Solutions Corporation, Hsinchu (TW)

( * ) Notice: Subject to any disclaimer, the term of this patent is extended or adjusted under 35 U.S.C. 154(b) by 0 days.

(21) Appl. No.: 12/835,814

(22) Filed: Jul. 14, 2010

(65) Prior Publication Data
US 2011/0219388 A1  Sep. 8, 2011

(30) Foreign Application Priority Data

Mar. 4, 2010 (CN) .......................... 2010 1 0128965

(51) Int. Cl.
*G11B 33/12* (2006.01)

(52) U.S. Cl. ...................................... 720/652; 720/601
(58) Field of Classification Search .................. 720/601, 720/651–653, 685, 646, 647; 360/245.6–246; 174/72 TR, 117 F
See application file for complete search history.

(56) References Cited

U.S. PATENT DOCUMENTS

| | | | |
|---|---|---|---|
| 6,320,835 B1 * | 11/2001 | Kamei | 720/653 |
| 7,698,714 B2 * | 4/2010 | Choi | 720/601 |
| 2004/0205785 A1 * | 10/2004 | Takahashi et al. | 720/601 |
| 2007/0101350 A1 * | 5/2007 | Gotoh et al. | 720/685 |
| 2009/0044206 A1 * | 2/2009 | Onuma et al. | 720/601 |

FOREIGN PATENT DOCUMENTS

| | | | |
|---|---|---|---|
| CN | 101211591 A | * | 7/2008 |
| KR | 694261 B1 | * | 3/2007 |

* cited by examiner

*Primary Examiner* — Craig A. Renner
*Assistant Examiner* — Gustavo Polo
(74) *Attorney, Agent, or Firm* — McClure, Qualey & Rodack, LLP

(57) ABSTRACT

The present invention discloses a slim optical disc drive comprising a case with an upper cover and a lower cover, a disc tray for loading and unloading an optical disc, a first circuit board disposed on the lower cover, a second circuit board disposed on the disc tray, and a flexible flat cable for connecting the first circuit board and the second circuit board. The flexible flat cable comprises a fixed portion and a movable portion, and a patch is adhered to the movable portion of the flexible flat cable. The patch has a first end and a second end, and the width of the first end is larger than that of the second end.

6 Claims, 4 Drawing Sheets

SLIM OPTICAL DISC DRIVE WITH FLEXIBLE FLAT CABLE ASSEMBLY

This application claims the benefit of People's Republic of China application Serial No. 201010128965.0, filed Mar. 4, 2010, the subject matter of which is incorporated herein by reference.

FIELD OF THE INVENTION

The present invention relates to an optical disc drive, particularly, to a slim optical disc drive.

BACKGROUND OF THE INVENTION

Generally speaking, the optical disc drive can be divided into a half-height optical disc drive and a slim optical disc drive. Comparing with the half-height optical disc drive used in a desktop computer, the slim optical disc drive used in a laptop computer has less volume and lighter weight. With the technical progress, the height of the slim optical disc drive is reduced to 1.27 cm or so.

FIG. 1 shows a schematically diagram for a cross-section of a well-known slim optical disc drive 1 wherein a disc tray 13 is ejected from a case 10. The well-known slim optical disc drive 1 comprises a case 10, a disc tray 13, a first circuit board 14, a second circuit board 15, and a flexible flat cable (FFC) 16. The case 10 comprises an upper cover 11 and a lower cover 12. The first circuit board 14 is disposed on the lower cover 12 and the second circuit board 15 is disposed on the disc tray 13. The flexible flat cable 16 connects the first circuit board 14 and the second circuit board 15 for transmitting information signals. The disc tray 13 is movably disposed on the lower cover 12. A spindle motor 19 and an optical pickup head 18 for spinning and reading an optical disc 17 are disposed on the disc tray 13.

As shown in FIG. 1, the flexible flat cable 16 has a first electric connecter 163 for connecting to the first circuit board 14 and a second electric connecter 164 for connecting to the second circuit board 15. The flexible flat cable 16 further has a bending portion 161 between the first electric connecter 163 and second electric connecter 164. When the disc tray 13 moves into the case 10, the disc tray 13 leads the second electric connecter 164 together to move into the case 10, and, during the movement of the disc tray 13, the position of the bending portion 161 located on the flexible flat cable 16 is changed and moved closer to the second electric connecter 164. Furthermore, a pendent portion 162 of the flexible flat cable 16 is formed between the second electric connecter 164 and the bending portion 161 because of a frictional force resulted from the contact between the top of the bending portion 161 and the upper cover 11.

However, the inner space of the slim optical disc drive is limited, and the room for containing the flexible flat cable is also limited. Especially to an ultra-slim optical disc drive, the height of which is only 0.95 cm and the distance between the bottom of the disc tray and the lower cover is around 0.4 to 0.5 cm. Furthermore, as the slim optical disc drive is installed in the laptop computer, the inner temperature of the slim optical disc drive is increased with the operation of the laptop computer for a long time. The increased inner temperature of the slim optical disc drive results in the hardening of the flexible flat cable.

The limited space and the hardened effect mentioned above will increase the frictional force resulted from the contact between the top of the bending portion 161 and the upper cover 11 so that the pendent amount of the pendent portion 162 will be increased. In the case that the pendent amount of the pendent portion 162 is larger than the allowed space between the bottom of the disc tray 13 and the lower cover 12 as shown in FIG. 1, the pendent portion 162 will be gripped between the disc tray 13 and lower cover 12 when the disc tray 13 moves into the case 10.

Moreover, when the disc tray 13 moves into the case 10, the pendent amount of the pendent portion 162 is changed with the changed position of the bending portion 161 located on the flexible flat cable 16. After loading and unloading the disc tray 13 several times, the flexible flat cable 16 will be folded repeatedly and produce the stress concentrated effect, which may result in a broken circuit of the inner conductor of the flexible flat cable 16 and influence the normal function of the optical disc drive.

Accordingly, how to prevent the flexible flat cable being gripped and provide suitable supporting force on the flexible flat cable is a problem which needs to be solved.

SUMMARY OF THE INVENTION

The present invention discloses a slim optical disc drive to prevent the flexible flat cable from being jammed between the disc tray and the case, and to provide suitable supporting force on the flexible flat cable during loading and unloading the disc tray.

The present invention discloses a slim optical disc drive comprising a case with an upper cover and a lower cover, a disc tray for loading and unloading an optical disc, a first circuit board disposed on the lower cover, a second circuit board disposed on the disc tray, and a flexible flat cable for connecting the first circuit board and the second circuit board. The flexible flat cable comprises a fixed portion and a movable portion, and a patch is adhered to the movable portion of the flexible flat cable. The patch has a first end and a second end, and the width of the first end is larger than the width of the second end.

According to a preferred embodiment of the present invention, the flexible flat cable further comprises a second electric connector for connecting the second circuit board, and the first end of the patch is closer to the second electric connector than the second end of the patch.

According to a preferred embodiment of the present invention, the variation of the width between the first end and the second end of the patch is a linear variation or a non-linear variation.

According to a preferred embodiment of the present invention, the patch is divided into a rectangular area and a trapezoid area, and the width of the rectangular area is fixed, and the width of the trapezoid area is varied linearly or non-linearly.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
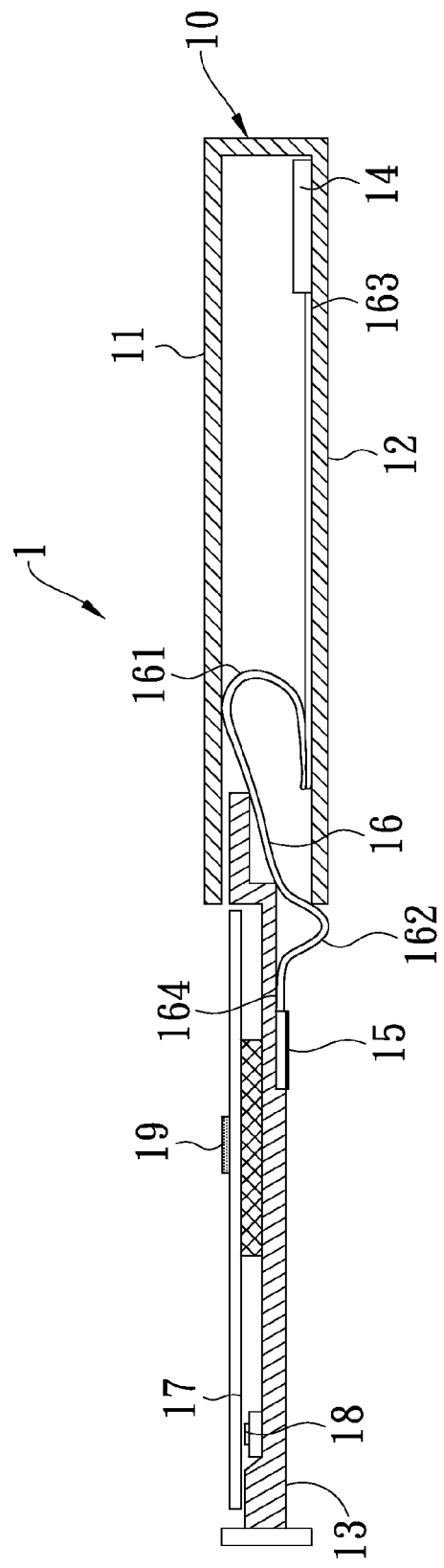
FIG. 1 shows a schematically diagram for a cross-section of a well-known slim optical disc drive wherein a disc tray is ejected from a case.
Figure 2:
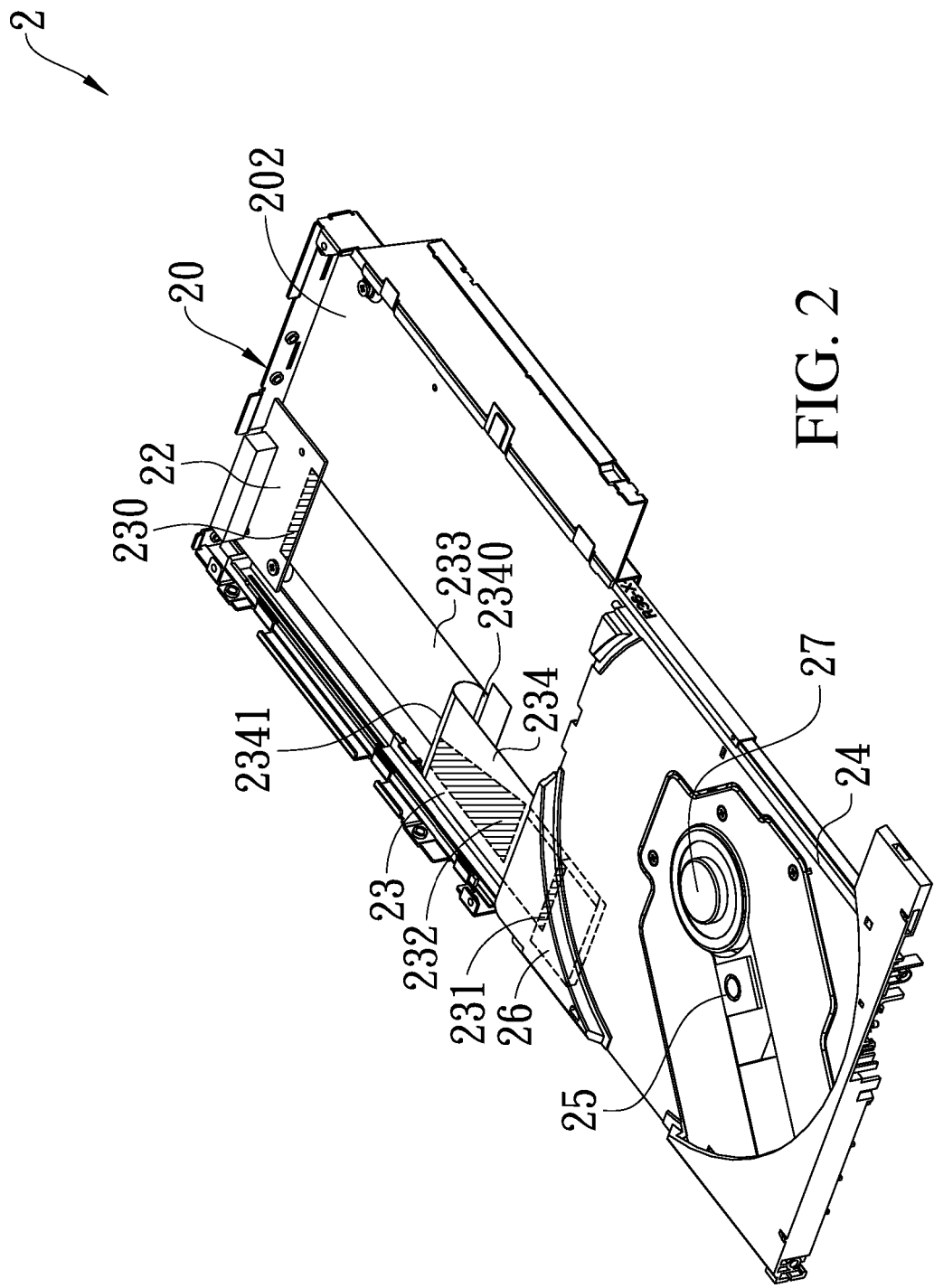
FIG. 2 shows a schematically diagram of a slim optical disc drive of the preferred embodiment of the present invention.

Please refer to FIG. 2. FIG. 2 shows a schematically diagram of a slim optical disc drive 2 of the preferred embodiment of the present invention, wherein the upper cover 201 is removed. In the preferred embodiment of the present invention, the slim optical disc drive 2 comprises a case 20, a first circuit board 22, a disc tray 24, a second circuit board 26 and a flexible flat cable 23.

The case 20 comprises an upper cover 201 and a lower cover 202 as shown in FIG. 3. The disc tray 24 is placed in a space formed between the upper cover 201 and the lower cover 202. The disc tray 24 is movably disposed on the lower cover 202 for loading and ejecting an optical disc into/from the slim optical disc drive 2. A spindle motor 27 and an optical pickup head 25 for spinning and reading the data of the optical disc are disposed on the disc tray 24.

The flexible flat cable 23 is a soft-strip cable comprising several copper lines covered within nonconductor. The flexible flat cable 23 has a first electric connector 230 for connecting to the first circuit board 22 and a second electric connector 231 for connecting to the second circuit board 26. The flexible flat cable 23 further has a fixed portion 233 and a movable portion 234. The fixed portion 233 is fixed on the lower cover 202 and the movable portion 234 is folded above the fixed portion 233. The movable portion 234 comprises a bending portion 2341. When the disc tray 24 moves into or out of the case 20, the disc tray 24 leads the movable portion 234 together to move, and, during the movement of the disc tray 24, the position of the bending portion 2341 located on the flexible flat cable 23 is changed according to the movement of the movable portion 234.

The flexible flat cable 23 further has a fold portion 2340 between the fixed portion 233 and the movable portion 234. The fold portion 2340 divides the fixed portion 233 and the movable portion 234. One end of the fixed portion 233 is the first electric connector 230 for connecting the first circuit board 22, and the other end of the fixed portion 233 is the fold portion 2340. The fold portion 2340 is folded and overlapped on the fixed portion 233. One end of the movable portion 234 is the fold portion 2340, and the other end of the movable portion 234 is the second electric connector 231 for connecting the second circuit board 26.

Figure 3A:
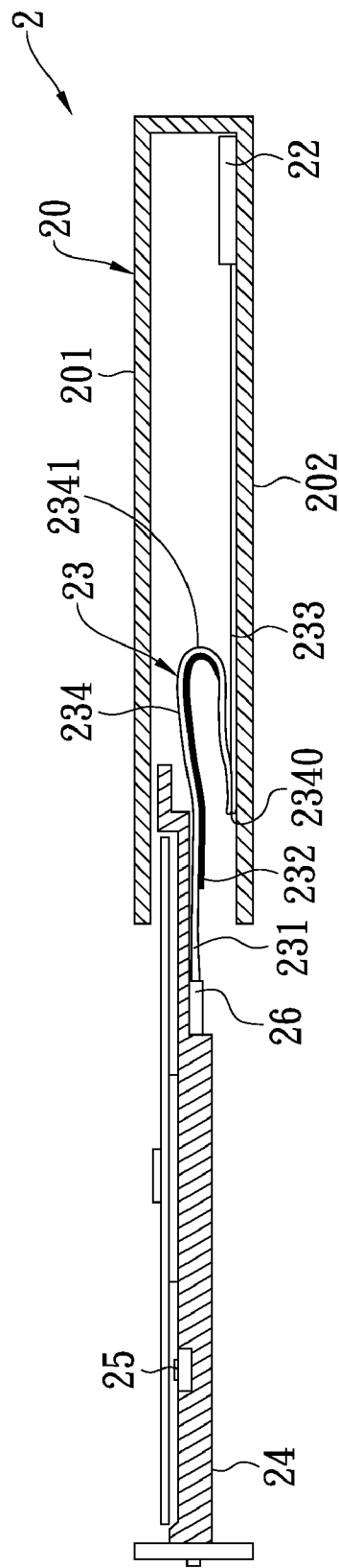
FIG. 3A shows a cross-section of the slim optical disc drive of the present invention wherein the disc tray is ejected from the case.
Figure 3B:
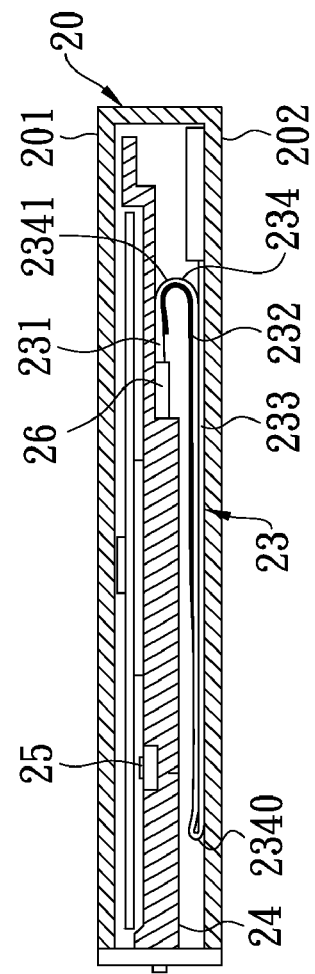
FIG. 3B shows a cross-section of the slim optical disc drive of the present invention wherein the disc tray is loaded in the case.

Please refer to FIG. 3A and FIG. 3B. FIG. 3A shows a cross-section of the slim optical disc drive 2 wherein the disc tray 24 is ejected from the case 20. FIG. 3B shows a cross-section of the slim optical disc drive 2 wherein the disc tray 24 is loaded in the case 20. When the disc tray 24 is ejected from the case 20, the movable portion 234 bended behind the disc tray 24, therefore, forms the bending portion 2341. When the disc tray 24 is moved into the case 20, the disc tray 24 leads the second electric connector 231 to move together, and the movable portion 234 is moved backward and overlapped on the fixed portion 233 gradually as shown in FIG. 3B. Moreover, at that time, the position of the bending portion 2341 on the flexible flat cable 23 is moved to a position close to the second electric connector 231.

Figure 4A:
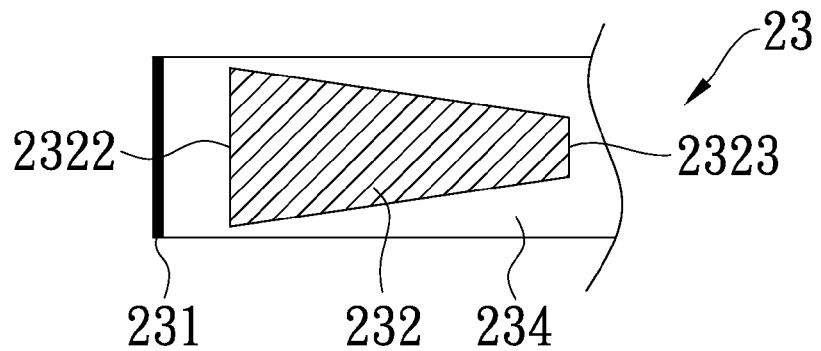
FIG. 4A to 4C show the different embodiments of patch pasted on the flexible flat cable according to the present invention.
Figure 4B:
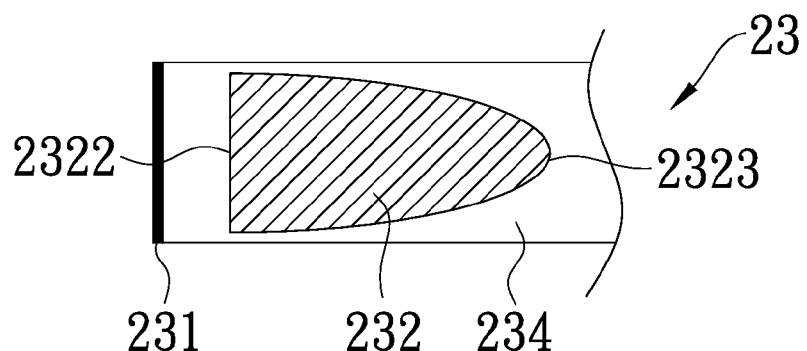
Figure 4C:
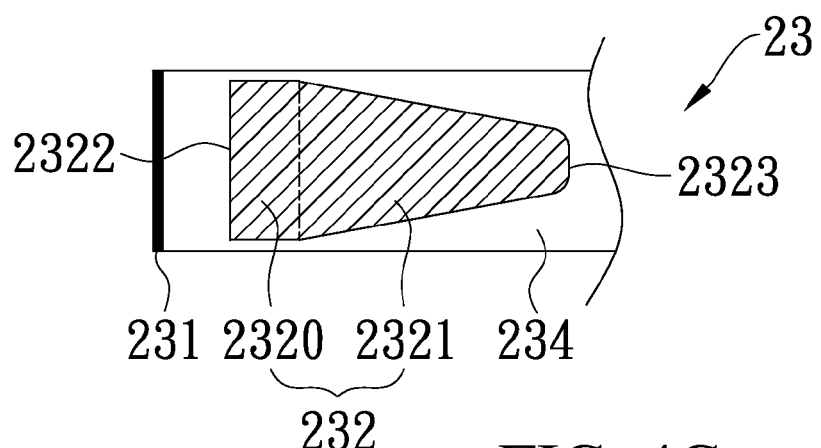

The slim optical disc drive of the present application further comprises a patch 232. Please refer to FIG. 4A to FIG. 4C. FIG. 4A to FIG. 4C show the different embodiments of patch 232 pasted on the flexible flat cable 23 according to the present invention. According to the embodiments of the present invention, the patch 232 is adhered to the movable portion 234 of the flexible flat cable 23 and comprises a first end 2322 near the second electric connector 231 and a second end 2323 far from the second electric connector 231. The width of the first end 2322 is larger than that of the second end 2323.

According to the embodiments of the present invention, the preferred length of the movable portion 234 of the flexible flat cable is around 7.83 to 7.97 cm. The preferred distance between the first end 2322 of the patch 232 and the second electric connector 231 is around 1.15 to 1.25 cm.

In the present invention, the shape of the patch 232 is not limited, and the shape of the patch 232 can be changed according to the actual implement by the person in this art. Please refer to FIG. 4A. FIG. 4A shows one of the preferred embodiments of the patch 232. In this preferred embodiment, the patch 232 is trapezoid, and the variation of the width between the first end 2322 and the second end 2323 is a linear variation. In another preferred embodiment of the patch 232 as shown in FIG. 4B, the patch 232 is bullet-shaped, and the variation of the width between the first end 2322 and the second end 2323 is a non-linear variation.

In a further preferred embodiment of the patch 232 as shown in FIG. 4C, the patch 232 is hexagon, which is divided into a rectangular area 2320 and a trapezoid area 2321. The width between the first end 2322 and the second end 2323 of the patch 232 comprises a constant width (the width of the rectangular area 2320) and a varied width changed in linear or nonlinear (the width of the trapezoid area 2321).

According the to the patch design provided in the present invention, as the width of the first end 2322 is larger than the width of the second end 2323, the supporting force provided by the first end 2322 of the patch 232 to the flexible flat cable 23 is larger than that provided by the second end 2323 of the patch 232 to the flexible flat cable 23. In other words, with the width of the patch 232 being gradually reduced from the first end 2322 to the second end 2323, the supporting force that the patch 232 provides to the flexible flat cable 23 is also gradually reduced from the first end 2322 to the second end 2323. Therefore, when the disc tray 24 is loading into the case 20, the patch 232 provides different and suitable supporting forces at different positions of the flexible flat cable 23 to avoid the flexible flat cable 23 being jammed between the disc tray 24 and the case 20.

Please refer to FIG. 3A again. When the disc tray 24 is at the ejecting position, as the supporting force provided from the patch 232 to the flexible flat cable 23 is gradually reduced from the end of the second connector 231 to the fold portion 2340, the supporting force provided at a position near the second connector end 231 of the flexible flat cable 23 is enough to avoid the flexible flat cable 23 being over-pendent and resulting in the flexible flat cable 23 being jammed between the disc tray 24 and the case 20. Moreover, according to the design of the reduction of the supporting force from the second connector end 231 to the fold portion 2340, the over-large supporting force is avoided to be provided on the fold portion 2340 of the movable portion 234 so that the effective force on the bending portion 2341 resulting from the fold portion 2340 is reduced and the stress concentrated effect is also reduced when repeatedly loading and unloading the disc tray 24. Therefore, a broken circuit of the inner conductor of the flexible flat cable 16 is avoided and the lifetime of the flexible flat cable is increased.

What is claimed is:

1. A slim optical disc drive, comprising:
a case comprising an upper cover and a lower cover;
a disc tray movably disposed in the case for loading and unloading an optical disc;
a first circuit board disposed on the lower cover;
a second circuit board disposed on the disc tray;
a flexible flat cable for connecting the first circuit board and the second circuit board, wherein the flexible flat cable comprises a fixed portion and a movable portion; and
a patch adhered to the movable portion of the flexible flat cable to be moved with the movable portion, wherein the width of the patch is gradually reduced from a first end to a second end of the patch and is smaller than the width of the flexible flat cable.

2. The slim optical disc drive according to claim 1, wherein the flexible flat cable further comprises an electrical connector for connecting the second circuit board, and the first end of the patch is closer to the electrical connector than the second end of the patch.

3. The slim optical disc drive according to claim 2, wherein the distance between the first end of the patch and the electrical connector is around 1.15 to 1.25 cm.

4. The slim optical disc drive according to claim 1, wherein the shape of the patch is a trapezoid or a bullet shape.

5. The slim optical disc drive according to claim 1, wherein the length of the movable portion of the flexible flat cable is 7.83 to 7.97 cm.

6. The slim optical disc drive according to claim 1, wherein the movable portion of the flexible flat cable connects to the second circuit board, and the fixed portion of the flexible flat cable connects to the first circuit board.

* * * * *